United States Patent
Doi et al.

(10) Patent No.: US 8,269,392 B2
(45) Date of Patent: Sep. 18, 2012

(54) ROTOR FOR PERMANENT MAGNET ROTARY MACHINE

(75) Inventors: Yuhito Doi, Tokyo (JP); Takehisa Minowa, Tokyo (JP); Hajime Nakamura, Tokyo (JP); Koichi Hirota, Tokyo (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 154 days.

(21) Appl. No.: 12/893,772

(22) Filed: Sep. 29, 2010

(65) Prior Publication Data

US 2011/0080066 A1 Apr. 7, 2011

(30) Foreign Application Priority Data

Oct. 1, 2009 (JP) .................................. 2009-229623

(51) Int. Cl.
*H02K 21/12* (2006.01)
(52) U.S. Cl. ............................... 310/156.53; 310/156.56
(58) Field of Classification Search ............. 310/156.43, 310/156.53–156.61
See application file for complete search history.

(56) References Cited

U.S. PATENT DOCUMENTS

| | | | |
|---|---|---|---|
| 5,034,146 A | | 7/1991 | Ohashi et al. |
| 5,982,073 A | * | 11/1999 | Lashmore et al. ...... 310/216.001 |
| 6,072,256 A | * | 6/2000 | Shon et al. ............... 310/156.53 |
| 6,849,981 B2 | * | 2/2005 | Kojima et al. ........... 310/156.43 |
| 6,849,983 B2 | * | 2/2005 | Tajima et al. .................. 310/166 |
| 7,800,271 B2 | * | 9/2010 | Komuro et al. ........... 310/156.53 |
| 7,880,357 B2 | * | 2/2011 | Suzuki et al. ............. 310/156.43 |
| 8,030,817 B2 | * | 10/2011 | Sakai et al. ............... 310/156.53 |
| 8,072,109 B2 | * | 12/2011 | Yamashita et al. ....... 310/156.43 |
| 2008/0245442 A1 | | 10/2008 | Nakamura et al. |
| 2011/0068651 A1 | | 3/2011 | Miyata et al. |

FOREIGN PATENT DOCUMENTS

| | | |
|---|---|---|
| JP | 5-021218 A | 1/1993 |
| JP | 5-31807 B | 5/1993 |
| WO | 2006/043348 A1 | 4/2006 |

OTHER PUBLICATIONS

Lucas, Brad; "Enhancing Performance of NdFeB Magnets using the Grain Boundary Diffusion Process (GBDP) and their Effective Application", Magnetics Conference 2009, Apr. 15-16 Chicago, IL.

(Continued)

*Primary Examiner* — Thanh Lam
(74) *Attorney, Agent, or Firm* — Westerman, Hattori, Daniels & Adrian, LLP

(57) ABSTRACT

A permanent magnet rotary machine comprises a rotor comprising a rotor core and a plurality of permanent magnet segments embedded in the rotor core and a stator having a plurality of coils and disposed to define a gap with the rotor, or a permanent magnet rotary machine comprises a rotor comprising a rotor core and a plurality of permanent magnet segments mounted on the surface of the rotor core and a stator having a plurality of coils and disposed to define a gap with the rotor. In the rotor, each permanent magnet segment is an assembly of divided permanent magnet pieces, the coercive force near the surface of the magnet piece is higher than that in the interior of the magnet piece, and the assembly allows for electrical conduction between the magnet pieces.

8 Claims, 12 Drawing Sheets

OTHER PUBLICATIONS

Machida, Kenichi et al.; "Grain Boundary Modification and Magnetic Properties of Nd-Fe-B Sintered Magnets"; Proceeding of Spring Meeting of Japan Society of Power and Power Metallurgy, 2004, p. 202.

Durst, K. D. et al.: "The Coercive Field of Sintered and Melt-Spun NdFeB Magnets,"; Journal of Magnetism and Magnetic Materials, vol. 68, (1987), pp. 63-75.

Parks, K. T. et al.; "Effect of Metal-Coating and Consecutive Heat Treatment on Coercivity of Thin Nd-Fe-B Sintered Magnets," Proceedings of the Sixteenth International Workshop on Rare-Earth Magnets and Their Applications, Sendai, (2000), p. 257-264.

Aoyama, Yasuaki et al.; "Evaluation of the Alternating Magnetic Loss in Divided Nd-Fe-B Sintered Magnet"; The Papers of Joint Technical Meeting on Static Apparatus and Rotating Machinery, The Institute of Electrical Engineers of Japan, Aug. 25, 2006, p. 41-46.

* cited by examiner

MAGNETIZATION DIRECTION

EDDY CURRENT

TEMPERATURE

ROTOR AXIS SIDE    STATOR SIDE

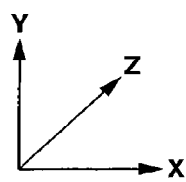

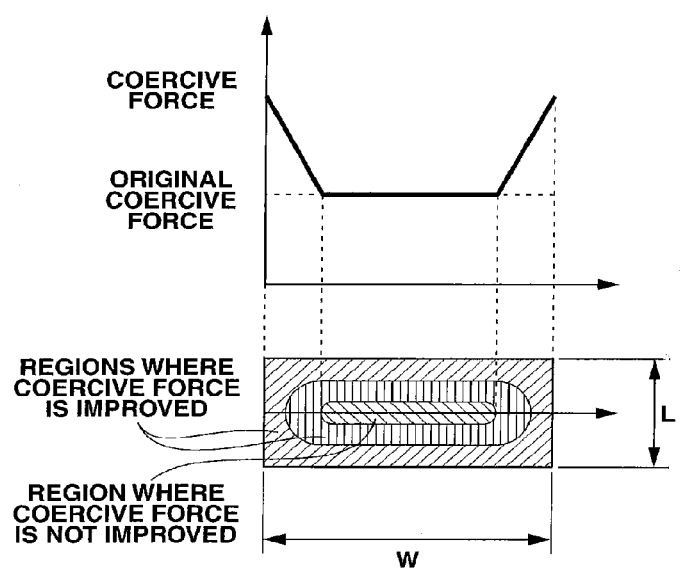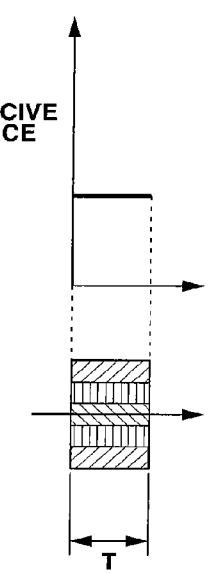

FIG.11A FIG.11B
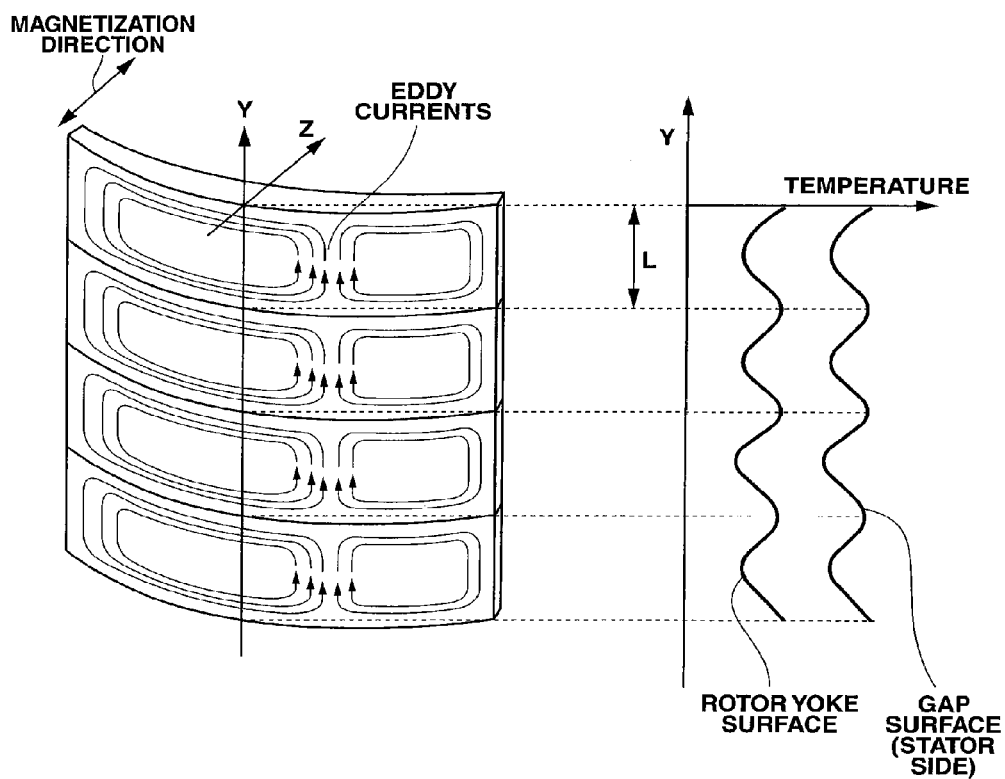

ROTOR FOR PERMANENT MAGNET ROTARY MACHINE

CROSS-REFERENCE TO RELATED APPLICATION

This non-provisional application claims priority under 35 U.S.C. §119(a) on Patent Application No. 2009-229623 filed in Japan on Oct. 1, 2009, the entire contents of which are hereby incorporated by reference.

TECHNICAL FIELD

This invention relates a permanent magnet rotary machine comprising a rotor comprising a rotor core and a plurality of permanent magnet segments embedded in the rotor core and a stator having a plurality of coils and disposed to define a gap with the rotor (generally referred to as interior permanent magnet (IPM) rotary machine), or a permanent magnet rotary machine comprising a rotor comprising a rotor core and a plurality of permanent magnet segments mounted on the surface of the rotor core and a stator having a plurality of coils and disposed to define a gap with the rotor (generally referred to as surface permanent magnet (SPM) rotary machine). More particularly, it relates to the rotor in the permanent magnet structure rotary machine, which is best suited as electric vehicle motors, power generators, and factory automation (FA) motors capable of high speed rotation.

BACKGROUND ART

Sintered Nd-base magnets have a growing range of application due to their excellent magnetic properties. Also in the field of rotary machines including motors and power generators, permanent magnet rotary machines utilizing sintered Nd-base magnets were developed to meet the recent demand for size, profile and weight reductions, performance enhancement and energy saving. Since IPM rotary machines of the structure wherein magnet parts are embedded within the rotor can utilize not only the torque by magnetization of the magnet, but also the reluctance torque by magnetization of the rotor yoke, research efforts have been made thereon as high-performance rotary machines. These rotary machines have a high level of mechanical safety in that throw-out of magnet parts by centrifugal force during rotation is prohibited since magnet parts are embedded within the rotor yoke made of silicon steel sheets or the like, and are capable of high-torque operation or operation at widely varying speeds by control of current phase. They represent energy-saving, high-efficiency and high-torque motors. In these years, the IPM rotary machines find rapid widespread utilization as motors and power generators in electric vehicles, hybrid automobiles, high-performance air conditioners, industrial tools, and trains.

SPM rotary machines of the structure wherein magnet parts are attached to the surface of the rotor have advantages including efficient utilization of the strong magnetism of Nd base magnets, good linearity of motor torque, and ease of control. An optimized shape of magnet parts leads to motors with a minimal cogging torque. They are used as controlling motors in some electric vehicles, power steering systems, and the like.

Permanent magnets in rotary machines are exposed to high temperature due to the heat generated by windings and cores and have a likelihood of demagnetization by the demagnetizing field from the windings. There thus exists a demand for sintered Nd base magnets in which the coercive force which is an index of heat resistance and demagnetization resistance is above a certain level and the remanence (or residual magnetic flux density) which is an index of the magnitude of magnetic force is as high as possible.

Further, sintered Nd base magnets are conductors having an electric resistance of 100 to 200 μΩ-cm. As the rotor rotates, the magnet undergoes a variation of magnetic flux density, by which eddy currents flow. Effective means for reducing eddy currents is to divide a magnet body to interrupt the eddy current path. While division of a magnet body into smaller pieces leads to a more reduction of eddy current loss, it becomes necessary to take into account such problems as an increase of manufacturing cost and a lowering of output due to a reduction of magnet volume by increased interstices.

The eddy current path runs in a plane perpendicular to the magnetization direction of a magnet, with a higher current density prevailing in an outer peripheral portion. The current density is also higher at a side closer to the stator. That is, the amount of heat generated by eddy currents is greater near the magnet surface, so that the magnet surface region assumes a higher temperature and becomes prone to demagnetization. To suppress demagnetization by eddy currents, a sintered Nd base magnet in which the coercive force which is an index of demagnetization resistance is higher in the magnet surface region than in the magnet interior is required.

Several measures are known to improve the coercive force. An increase in the remanence of sintered Nd base magnet is achieved by increases in the volume fraction of $Nd_2Fe_{14}B$ compound and the degree of crystal orientation, and various improvements in process have been made therefor. As to an increase in coercive force, there are known various approaches including formation of crystal grains of finer size, use of an alloy composition having an increased Nd content, and addition of an effective element. Of these, the currently most common approach is the use of an alloy composition having Dy or Tb substituted for part of Nd. By substituting such elements for Nd of $Nd_2Fe_{14}B$ compound, the compound is increased in anisotropic magnetic field as well as coercive force. On the other hand, the substitution of Dy or Tb decreases the saturation magnetic polarization of the compound. Accordingly, the attempt to increase the coercive force by the above approach fails to avoid a lowering of remanence.

In sintered Nd base magnets, the coercive force is given by the magnitude of an external magnetic field created by nuclei of reverse magnetic domains at grain boundaries. Creation of nuclei of reverse magnetic domains is largely dictated by the structure of the grain boundary in such a manner that any disorder of grain structure in proximity to the boundary invites a disturbance of magnetic structure, helping creation of reverse magnetic domains. It is generally believed that a magnetic structure extending from the grain boundary to a depth of about 5 nm contributes to an increase of coercive force (See K. D. Durst and H. Kronmuller, "THE COERCIVE FIELD OF SINTERED AND MELT-SPUN NdFeB MAGNETS," Journal of Magnetism and Magnetic Materials, 68 (1987), 63-75).

By concentrating trace Dy or Tb only in proximity to the grain boundaries to increase the anisotropic magnetic field only in proximity to the boundaries, the coercive force can be increased while suppressing any decline of remanence (see JP-B 5-31807). Subsequently, the inventors established a production method comprising separately preparing a $Nd_2Fe_{14}B$ compound composition alloy and a Dy or Tb-rich alloy, mixing them and sintering the mixture (see JP-A 5-21218). In this method, the Dy or Tb-rich alloy becomes a liquid phase during the sintering and is distributed so as to surround the $Nd_2Fe_{14}B$ compound. As a consequence, substitution of Dy or Tb for Nd occurs only in proximity to grain boundaries in the compound, so that the coercive force can be effectively increased while suppressing any decline of remanence.

However, since the two types of alloy fine powders in the mixed state are sintered at a temperature as high as 1,000 to 1,100° C., the above-described method has a likelihood that Dy or Tb diffuses not only to the boundaries, but also into the interior of $Nd_2Fe_{14}B$ grains. An observation of the structure of an actually produced magnet shows that Dy or Tb has diffused to a depth of about 1 to 2 μm from the boundary in a grain boundary surface layer, the diffused area reaching 60% or more, calculated as volume fraction. As the distance of diffusion into grains becomes longer, the concentration of Dy or Tb near the boundaries becomes lower. An effective measure for positively suppressing the excessive diffusion into grains is by lowering the sintering temperature. However, this measure cannot be practically acceptable because it compromises densification by sintering. An alternative method of sintering at lower temperatures while applying stresses by means of a hot press or the like enables densification, but poses the problem of extremely reduced productivity.

On the other hand, it is reported that coercive force can be increased by machining a sintered magnet to a small size, depositing Dy or Tb on the magnet surface by sputtering, and heat treating the magnet at a temperature lower than the sintering temperature, thereby causing Dy or Tb to diffuse only to grain boundaries (see K. T. Park, K. Hiraga and M. Sagawa, "Effect of Metal-Coating and Consecutive Heat Treatment on Coercivity of Thin Nd—Fe—B Sintered Magnets," Proceedings of the Sixteen International Workshop on Rare-Earth Magnets and Their Applications, Sendai, p. 257 (2000); and K. Machida, H. Kawasaki, T. Suzuki, M. Ito and T. Horikawa, "Grain Boundary Tailoring of Sintered Nd—Fe—B Magnets and Their Magnetic Properties," Proceedings of the 2004 Spring Meeting of the Powder & Powder Metallurgy Society, p. 202). These methods allow for more effective concentration of Dy or Tb at grain boundaries and succeed in increasing the coercive force without a substantial loss of remanence. As the magnet becomes larger in specific surface area, that is, the magnet body becomes smaller, the amount of Dy or Tb fed becomes larger, indicating that this method is applicable to only compact or thin magnets. However, there is still left the problem of poor productivity associated with the deposition of metal coating by sputtering or the like.

WO 2006/043348 discloses means for efficiently improving coercive force which has solved the foregoing problems and lends itself to mass-scale production. When a sintered $R^1$—Fe—B magnet body, typically sintered Nd base magnet body is heated in the presence of a powder on its surface, the powder comprising one or more of $R^2$ oxides, $R^3$ fluorides, and $R^4$ oxyfluorides wherein each of $R^1$ to $R^4$ is one or more elements selected from among rare earth elements inclusive of Y and Sc, $R^2$, $R^3$ or $R^4$ contained in the powder is absorbed in the magnet body, whereby coercive force is increased while significantly suppressing a decline of remanence. Particularly when $R^3$ fluoride or $R^4$ oxyfluoride is used, $R^3$ or $R^4$ is efficiently absorbed in the magnet body along with fluorine, resulting in a sintered magnet having a high remanence and a high coercive force.

CITATION LIST

Patent Document 1: JP-B H05-31807
Patent Document 2: JP-A H05-21218
Patent Document 3: WO 2006/043348

Non-Patent Document 1: K. D. Durst and H. Kronmuller, "THE COERCIVE FIELD OF SINTERED AND MELT-SPUN NdFeB MAGNETS," Journal of Magnetism and Magnetic Materials, 68 (1987), 63-75

Non-Patent Document 2: K. T. Park, K. Hiraga and M. Sagawa, "Effect of Metal-Coating and Consecutive Heat Treatment on Coercivity of Thin Nd—Fe—B Sintered Magnets," Proceedings of the Sixteen International Workshop on Rare-Earth Magnets and Their Applications, Sendai, p. 257 (2000)

Non-Patent Document 3: K. Machida, H. Kawasaki, T. Suzuki, M. Ito and T. Horikawa, "Grain Boundary Modification and Magnetic Properties of Nd—Fe—B Sintered Magnets," Proceedings of Spring Meeting of Japan Society of Powder and Powder Metallurgy, 2004, p. 202

Non-Patent Document 4: Yasuaki Aoyama and Koji Miyata, "Evaluation of Alternating magnetic Loss in Divided Nd—Fe—B Sintered Magnet," The Papers of Joint Technical Meeting on Static Apparatus and Rotating Machinery, The Institute of Electrical Engineers of Japan, SA-06-83 and RM-06-85, Aug. 25, 2006, p. 41-46

SUMMARY OF INVENTION

An object of the present invention is to provide a rotor for use in a permanent magnet rotary machine having a high output and heat resistance.

By virtue of enhancement of magnet properties, motors using permanent magnet are designed to produce higher outputs. The output of a motor can be increased by increasing the torque and revolution of the motor. The increase of motor torque leads to an intensification of a demagnetizing field acting on the magnet, and the increase of revolution leads to an increase of the frequency of a magnetic field across the magnet. Both mean an increase of eddy current flowing across the magnet. As solutions to these problems, an improvement in the coercive force of magnet is effective to overcome the demagnetizing field, and division of a magnet into pieces is effective to overcome the increased eddy currents. However, there is a tendency that the number of divisions is further increased as a countermeasure to the high-frequency magnetic field due to accelerated revolution and inverter driving.

The magnet is divided for the purpose of disconnecting the eddy current flowpath. The divided surfaces of magnet pieces are treated for insulation as are magnetic steel sheets. An example is shown in FIG. 13A. When divided magnet pieces 12a are adhesively bonded or mechanically secured together to construct a permanent magnet segment 12, the magnet pieces 12a are previously coated on adjacent surfaces with an insulating resin composition or insulating inorganic composition, or a resin film or glass fiber layer is sandwiched between magnet pieces 12a. In the permanent magnet segment 12 thus constructed, insulating layers 12b are formed between magnet pieces 12a.

As the number of divided magnet pieces increases, the volume of insulating layer within the overall volume of magnet segment becomes of significance. In an example wherein the insulating layer has a thickness of 0.5 mm, if the number of divided magnet pieces is 10, then the insulating layers sum to a total thickness of 4.5 mm. Since the volume of a space which is available for accommodating magnet in the motor is limited, increasing the number of divided magnet pieces results in a reduction of the net magnet volume. As the magnet is more divided to increase the number of insulating layers, the magnetic flux per volume available for magnet within the motor is reduced. An attempt to enhance the performance of motors or power generators fails.

The inventors have found that in a permanent magnet rotary machine, typically IPM or SPM rotary machine using a plurality of permanent magnet segments, better results are obtained when each of the permanent magnet segments is constructed as an assembly of two or more divided permanent magnet pieces (simply referred to as magnet pieces), the coercive force or heat resistance near the surface of the magnet piece is higher than that in the interior of the magnet piece, and the magnet pieces are disposed for electrical conduction in the assembly without providing an insulating layer capable of complete electrical insulation between the magnet pieces. In this connection, the inventors presumed that the methods of Machida et al. and WO 2006/043348 are suited for high-output rotary machines because of no loss of remanence, and since the coercive force near the surface of magnet pieces can be increased, the magnet pieces, when used in rotors in IPM or SPM rotary machines, are expected to minimize demagnetization due to heat generation by eddy currents. The inventors have found that application of such a method to individual magnet pieces of the permanent magnet assembly is effective in achieving the object of the invention, especially that a sintered Nd base magnet is used and divided into pieces for minimizing the heat generation by eddy currents, that the magnet pieces are used as the magnet for a rotor in a permanent magnet rotary machine, typically IPM or SPM rotary machine, and that magnet pieces in which the coercive force near their surface is higher than that in their interior, and in which heat resistance near their surface is improved are effective for use in a rotor in a permanent magnet rotary machine, typically IPM or SPM rotary machine.

More particularly, the inventors have found the following. When a permanent magnet rotary machine is loaded with magnet pieces into which a magnet has been divided for minimizing the heat generation by eddy current, the magnet pieces show a locally elevated temperature near their surface due to eddy current heat generation. For enhancing the heat resistance of magnet, it is effective to increase the coercive force near the surface of magnet whose temperature becomes elevated. Particularly for enhancing the coercive force near the surface of magnet, it is effective to use a sintered Nd base magnet having a coercive force profile from the surface toward the interior that is created by letting Dy or Tb diffuse from the magnet surface toward the interior. The diffusion of Dy or Tb from the surface toward the interior of magnet takes place mainly via grain boundaries. For example, the method of applying a Dy or Tb oxide powder, Dy or Tb fluoride powder or Dy or Tb-containing alloy powder to the magnet surface and letting Dy or Tb diffuse at a high temperature is effective as the diffusion reaction of Dy or Tb from the surface toward the interior of magnet.

When magnet pieces having a high magnetic flux density and a high coercive force are used and assembled into a magnet segment without providing an insulating layer therebetween, the resultant magnet segment can be used even in an environment where an alternating magnetic field is applied at a high frequency and exert high performance without reducing the magnetic flux despite a limited volume. The rotor using such magnet segments is useful in constructing a high-power rotary machine featuring a high revolution and torque. The present invention is predicated on these findings.

The present invention pertains to a permanent magnet rotary machine comprising a rotor comprising a rotor core and a plurality of permanent magnet segments embedded in the rotor core and a stator having a plurality of coils, the rotor and the stator being disposed to define a gap therebetween, or a permanent magnet rotary machine comprising a rotor comprising a rotor core and a plurality of permanent magnet segments mounted on the surface of the rotor core and a stator having a plurality of coils, the rotor and the stator being disposed to define a gap therebetween.

In one aspect, the invention provides the rotor wherein each of the permanent magnet segments is an assembly of two or more divided permanent magnet pieces, each of the divided permanent magnet pieces has a coercive force at a surface and an interior, the coercive force near the surface of the magnet piece is higher than that in the interior of the magnet piece, and the assembly allows for electrical conduction between the magnet pieces in the absence of an insulating layer capable of complete electrical insulation between the magnet pieces.

In another aspect, the invention provides the rotor wherein each of the permanent magnet segments is an assembly of two or more divided permanent magnet pieces, each of the divided permanent magnet pieces has heat resistance at a surface and an interior, the heat resistance near the surface of the magnet piece is higher than that in the interior of the magnet piece, and the assembly allows for electrical conduction between the magnet pieces in the absence of an insulating layer capable of complete electrical insulation between the magnet pieces.

In a preferred embodiment, the magnet pieces are of a sintered Nd base rare earth magnet. More preferably, each piece of sintered Nd base rare earth magnet has a coercive force profile from the surface toward the interior, which is created by letting Dy or Tb diffuse from the surface toward the interior of the magnet piece, typically mainly via grain boundaries. More preferably, the step of letting Dy or Tb diffuse from the surface toward the interior of the sintered Nd base rare earth magnet piece includes applying a Dy or Tb oxide powder, a Dy or Tb fluoride powder or a Dy or Tb-containing alloy powder to surfaces of the magnet piece, then holding the magnet piece at a high temperature sufficient to diffuse Dy or Tb.

In a preferred embodiment, each permanent magnet segment is constructed by assembling divided permanent magnet pieces into an assembly without insulating treatment.

Preferably the magnet pieces have a surface roughness Ry in the range of 50S to 0.8S.

Advantageous Effects of the Invention

The invention is successful in providing a permanent magnet rotary machine having a high output and heat resistance, the rotor of the machine being loaded with a permanent magnet, typically a sintered Nd base magnet, which has been divided into magnet pieces having a high remanence and a high coercive force, especially at an outer peripheral portion thereof, suited for use in rotors in IPM or SPM rotary machines. The rotor using magnet segments each consisting of a plurality of non-insulated magnet pieces is free from a reduction of net magnet volume by insulating layers between magnet pieces and exerts accordingly high performance. Since the insulating treatment of divided magnet pieces is obviated, the cost is saved.

BRIEF DESCRIPTION OF DRAWINGS

FIG. 7 illustrates the coercive force distribution in the magnet piece of FIG. 6A, FIG. 7A being in side surface, and FIG. 7B being in end surface.

FIG. 11A illustrates how eddy currents flow in the permanent magnet assembly of FIG. 9B in an SPM motor, and FIG. 11B illustrates the temperature distribution within the magnet pieces in the assembly.

DESCRIPTION OF EMBODIMENTS

The invention relates to a permanent magnet rotary machine, typically a permanent magnet rotary machine comprising a rotor comprising a rotor core and a plurality of permanent magnet segments embedded in the rotor core and a stator having coils, the rotor and the stator being disposed to define a gap therebetween (generally referred to as IPM rotary machine), or a permanent magnet rotary machine comprising a rotor comprising a rotor core and a plurality of permanent magnet segments mounted on the surface of the rotor core and a stator having coils, the rotor and the stator being disposed to define a gap therebetween (generally referred to as SPM rotary machine). The invention provides the rotor wherein each of the permanent magnet segments is an assembly of two or more divided permanent magnet pieces (simply referred to as magnet pieces), each of the magnet pieces has a coercive force or heat resistance at a surface and an interior, the coercive force or heat resistance near the surface of the magnet piece is higher than the coercive force or heat resistance in the interior of the magnet piece, and the magnet pieces are disposed for electrical conduction in the assembly in the absence of an insulating layer capable of complete electrical insulation between the magnet pieces.

Figure 1:
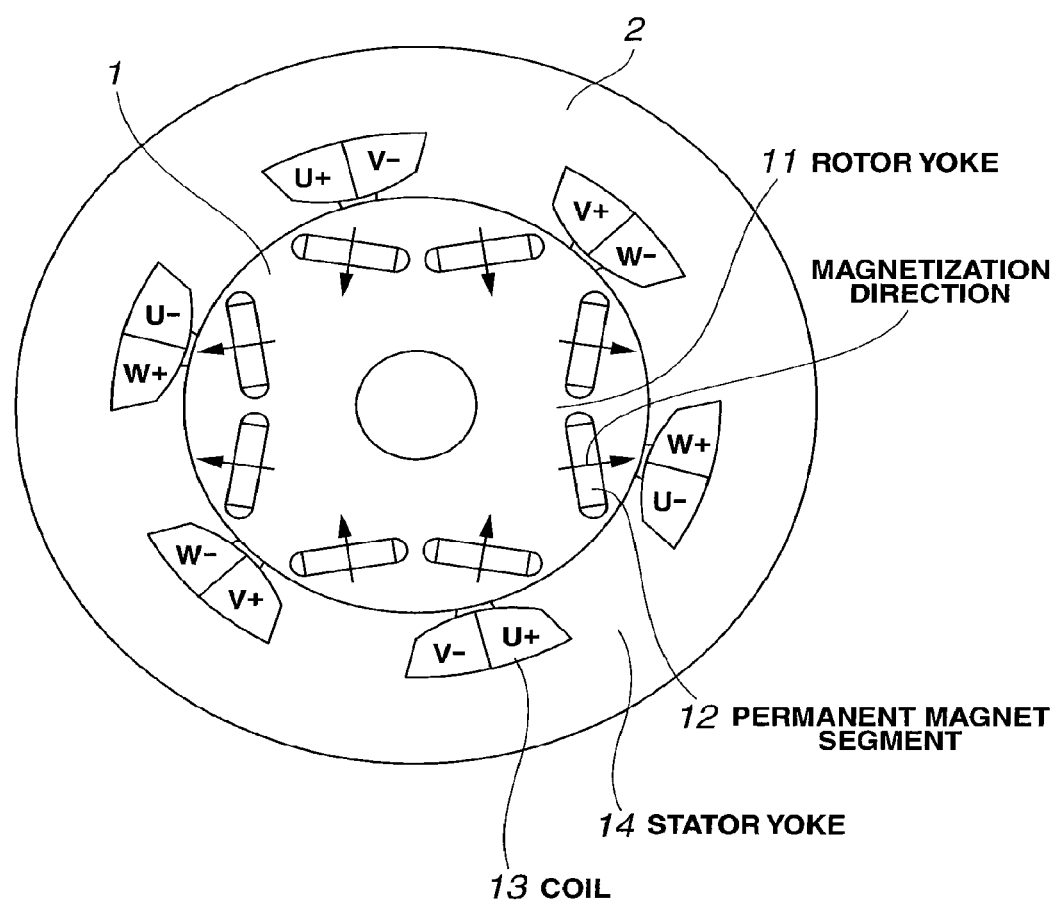
FIG. 1 is a cross-sectional view of one exemplary IPM motor of 4 poles/6 slots according to the invention.

FIG. 1 illustrates an exemplary IPM rotary machine. The machine in FIG. 1 includes a rotor 1 and a stator 2. The rotor 1 has a four-pole structure comprising a rotor yoke 11 of laminated magnetic steel sheets and permanent magnet segments 12 embedded therein. Instead, simple rectangular magnet parts may be disposed at four poles. The number of poles is selected in accordance with a particular purpose of the rotary machine. The stator 2 has a six-slot structure of laminated magnetic steel sheets, with a coil 13 concentratedly wound on each teeth. The coil 13 is of a three-phase Y-connection of U, V and W phases. Also shown in FIG. 1 is a stator yoke 14. In FIG. 1, the symbols "+" and "−" attached to U, V and W indicate winding directions of coils, with "+" indicating a direction emerging from the plane of sheet and "−" indicating an entering direction. While the rotor and stator are positioned as shown in FIG. 1, an alternating current of cosine wave flows as the U phase, an alternating current having a 120° lead phase relative to the U phase flows as the V phase, and an alternating current having a 240° lead phase relative to the U phase flows as the W phase. Then the rotor rotates counter-clockwise by the interaction between the magnetic flux of permanent magnets and the magnetic flux of coils. In FIG. 1, the arrow associated with each permanent magnet segment 12 indicates a magnetization direction.

Figure 3A:
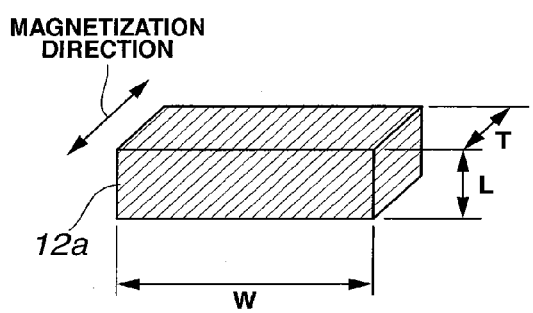
FIG. 3 illustrates one exemplary permanent magnet segment for use in the IPM motor according to the invention, FIG. 3A being a perspective view of a magnet piece which has undergone diffusion treatment with Dy or Tb from all surfaces, FIG. 3B being a perspective view of an assembly of such magnet pieces.
Figure 3B:
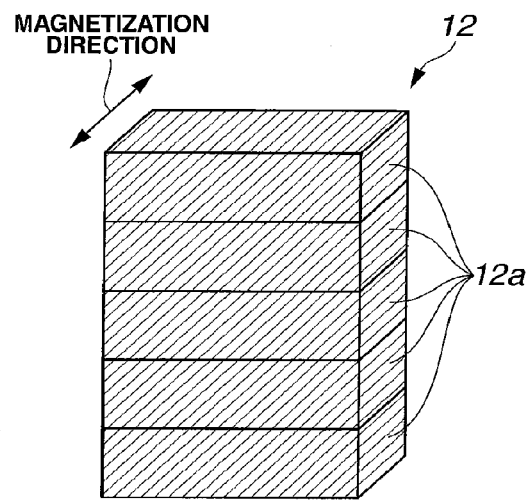
Figure 13A:
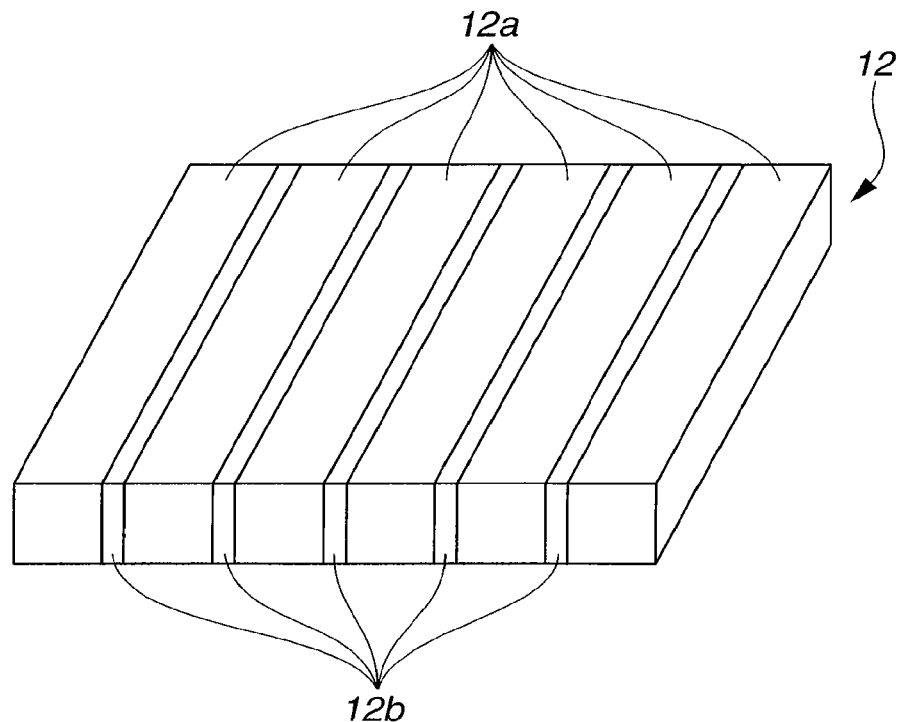
FIG. 13A is a perspective view of a permanent magnet segment in which insulating layers are formed between divided magnet pieces.
Figure 13B:
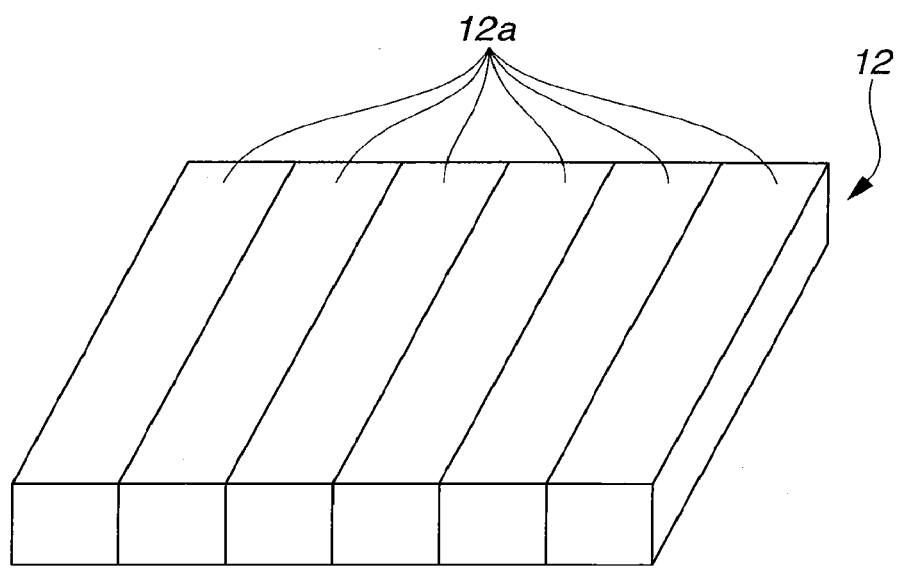
FIG. 13B is a perspective view of a permanent magnet segment which allows for electric conduction between divided magnet pieces in the absence of an insulating layer between magnet pieces.

According to the invention, the permanent magnet segment 12 is an assembly of a plurality of divided permanent magnet pieces 12a as shown in FIG. 3B, for example. In the assembly, the magnet pieces are contiguously disposed for electrical conduction because complete electrical insulation is omitted. For example, no insulating material is interposed between mating surfaces of adjacent magnet pieces, that is, adjacent magnet pieces are disposed in direct contact. The permanent magnet segment consisting of discrete permanent magnet pieces disposed for electrical conduction according to the invention performs well even in an environment where an alternating magnetic field is applied at a high frequency although the segment lacks insulating layers between magnet pieces as found in the prior art. Specifically, as shown in FIG. 13B, discrete permanent magnet pieces as machined from a magnet block are successively arranged or stacked in mutual contact with their surfaces as machined, that is, without forming an insulating layer between magnet pieces (i.e., without interposing an insulating film or coating an insulating material). The magnet pieces so arranged are fixedly secured to complete a permanent magnet segment.

The degree of electric conduction between magnet pieces varies with the roughness of mating surfaces of magnet pieces. From the standpoint of eliminating any insulating layer to prevent any loss of the magnet volume, magnet pieces preferably have a surface roughness Ry in the range of 50 (μm) S to 0.8 (μm) S. If magnet pieces have a surface roughness in excess of 50S, surfaces of magnet pieces may be in contact at their convex portions while their concave portions may define spaces which become large beyond the negligible level. This means a reduction of the net magnet volume of the segment. In order to smoothen magnet pieces to a surface roughness of less than 0.8S, the magnet pieces must be finely polished at the sacrifice of expense.

The magnet pieces 12a are preferably of sintered Nd base rare earth magnet. The sintered Nd base rare earth magnet used herein may be obtained by coarsely pulverizing a mother alloy, finely pulverizing, compacting and sintering in a standard way. As mentioned above, the invention uses a discrete sintered magnet in which a coercive force or heat resistance near the surface thereof is higher than a coercive force or heat resistance in the interior thereof, which can be produced by letting Dy or Tb diffuse from the magnet surface toward the interior, and mainly via grain boundaries. More specifically, use is made of a magnet piece which is obtained by a procedure including depositing Dy or Tb on surfaces of a magnet piece by sputtering and heat treating the magnet piece at a temperature lower than the sintering temperature, thereby letting Dy or Tb diffuse only to grain boundaries, or another procedure including applying a powder of Dy or Tb oxide, fluoride or oxyfluoride to surfaces of a magnet piece and heat treating the magnet piece and powder in vacuum or inert gas at a temperature lower than the sintering temperature.

More preferably, the desired magnet piece may be obtained by applying a Dy or Tb oxide powder, Dy or Tb fluoride powder or Dy or Tb-containing alloy powder to surfaces of a magnet piece and then holding the magnet piece at a high temperature for letting Dy or Tb diffuse.

Figure 2A:
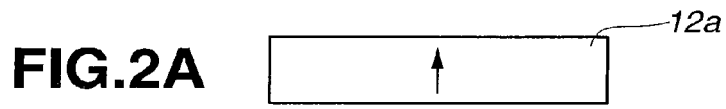
FIGS. 2A, 2B and 2C are cross-sectional views of exemplary magnet pieces which constitute a permanent magnet assembly in the IPM motor.
Figure 2B:
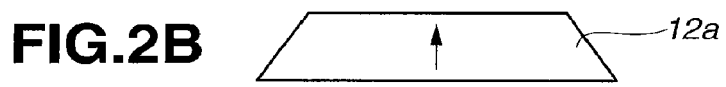
Figure 2C:

The permanent magnet (magnet piece) for use in the IPM rotary machine is obtained by machining a sintered magnet block into a predetermined shape using a grinding wheel, machining blade, wire saw or the like. The cross-sectional shape of the magnet piece is often a rectangular shape as shown in FIG. 2A from the standpoint of ease of working, although the magnet piece may be of a trapezoidal or arcuate shape as shown in FIG. 2B or 2C for the purpose of improving the performance of the rotary machine. It is noted that in FIG. 2, the arrow indicates a magnetization direction M.

The size of a magnet piece is not particularly limited. For diffusion treatment of a magnet piece with Dy or Tb, the proportion of diffusion of Dy or Tb increases as the specific surface area of a magnet piece becomes larger, i.e., the size of a magnet piece becomes smaller. It is then preferred that in FIGS. 3A, 6A, and 10A, the smallest one of dimensions W, L, and T is up to 50 mm, more preferably up to 30 mm, and most preferably up to 20 mm. The lower limit of this dimension is not critical although it is practically at least 0.1 mm.

Figure 10A:
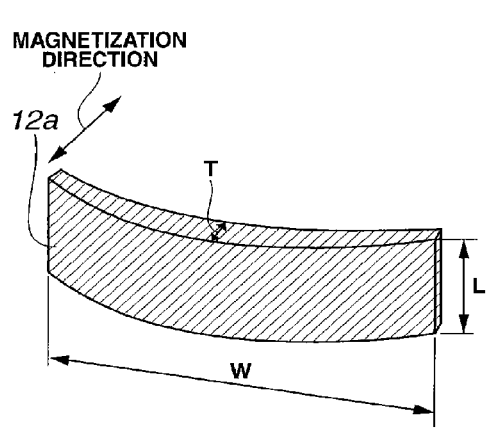
FIG. 10 illustrates one exemplary permanent magnet segment for use in the SPM motor according to the invention, FIG. 10A being a perspective view of a magnet piece which has undergone diffusion treatment with Dy or Tb from all surfaces, FIG. 10B being a perspective view of an assembly of such magnet pieces.
Figure 10B:
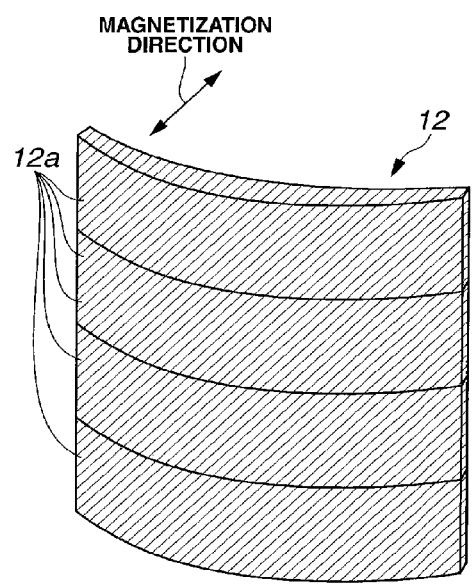
Figure 12A:
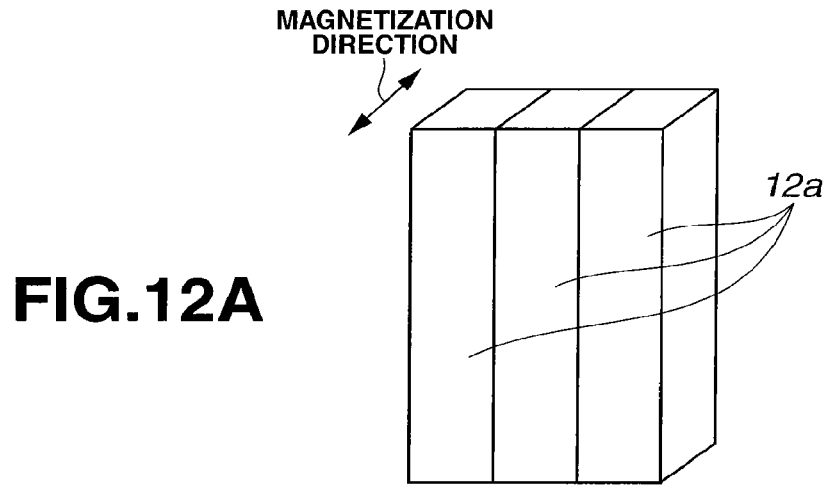
FIGS. 12A, 12B and 12C are perspective views of different permanent magnet assemblies.
Figure 12B:
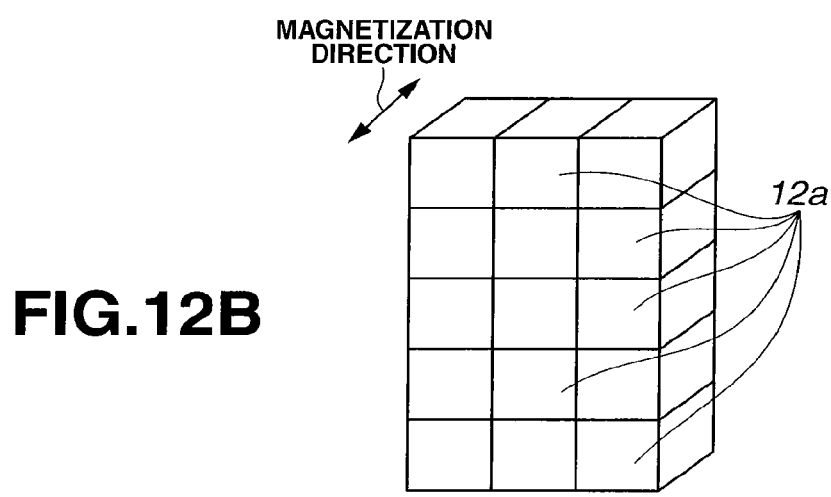
Figure 12C:
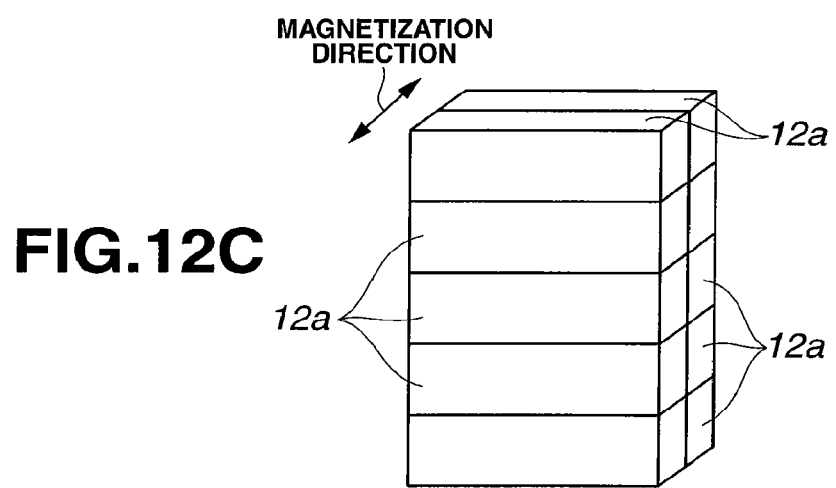

According to the invention, a starting magnet block is machined into permanent magnet pieces having the desired properties. The number of division of a permanent magnet segment is at least 2 pieces, preferably in the range of 2 to 50 pieces, and more preferably 4 to 25 pieces, and if necessary, divided magnet pieces are bonded with an adhesive to form an assembly. The assembly may be any of various embodiments including an assembly constructed by stacking a plurality of magnet pieces 12a of parallelepiped or curved plate shape, with their W direction (longitudinal direction) aligned with a horizontal direction, as shown in FIGS. 3B, 6B, and 10B; an assembly constructed by disposing magnet pieces 12a of parallelepiped shape with their longitudinal direction aligned with a vertical direction, juxtaposing a plurality of such magnet pieces in a row, and integrating them, as shown in FIG. 12A; an assembly constructed by stacking a plurality of magnet pieces 12a of cubic shape in a perpendicular direction, juxtaposing such stacks in a row in a transverse direction, and integrating them, as shown in FIG. 12B; and an assembly constructed by juxtaposing two stacks each consisting of magnet pieces of parallelepiped shape stacked as shown in FIG. 3B, and integrating them, as shown in FIG. 12C. The assembly is not limited to the illustrated embodiments.

The assembly of stacked magnet pieces is inserted into a bore in the rotor, constructing a magnet embedment rotor.

In the IPM rotary machine, the magnetic flux passing across the permanent magnet varies momentarily with rotation of the rotor, and this variation of magnetic field causes eddy currents to generate within the magnet. Eddy currents flow in a plane perpendicular to the magnetization direction of the magnet.

Figure 5A:
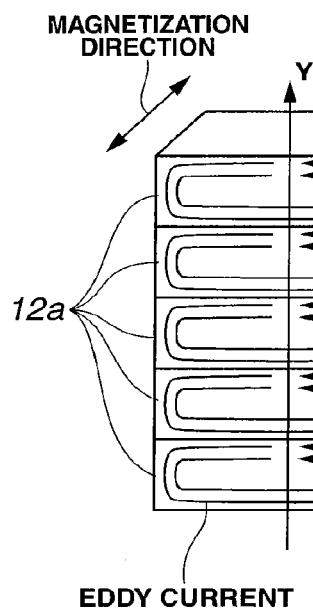
FIG. 5A illustrates how eddy currents flow in the permanent magnet assembly of FIG. 3B in an IPM motor.
Figure 5B:
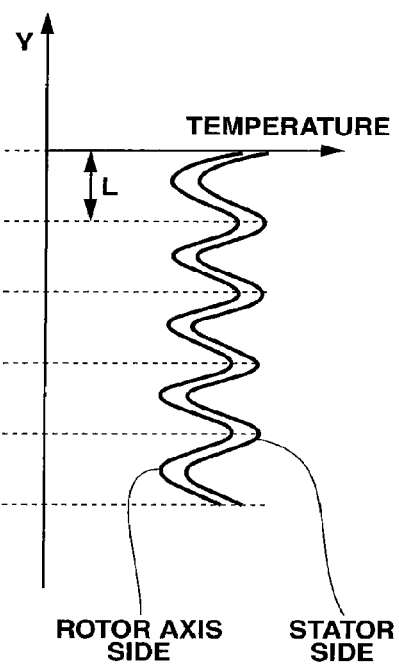
FIG. 5B illustrates the temperature distribution within the magnet pieces in the assembly.

Even in the magnet piece 12a, eddy currents flow in a plane perpendicular to the magnetization direction. The flow of eddy currents and the temperature distribution within the magnet pieces are summarized in the schematic view of FIG. 5. As seen from FIG. 5, the density of eddy current becomes higher at an outer peripheral portion of each magnet piece where the temperature rises. Since the magnetic field variation is greater on the stator side, the temperature distribution in the magnetization direction is slightly higher on the stator side than on the rotor axis side. To suppress demagnetization due to eddy currents, an Nd magnet piece is required in which the coercive force (serving as an index of demagnetization resistance) is higher near the surface of the magnet piece corresponding to the magnet outer peripheral portion than in the magnet interior. The magnet interior where less heat is generated by eddy currents does not need a more than necessity coercive force.

FIG. 3 illustrates one embodiment. Dy or Tb is diffused from all surfaces of magnet piece 12a as shown in FIG. 3A (the shaded zones are surfaces from which Dy or Tb is diffused). Five magnet pieces 12a having a thus increased coercive force near the surface thereof are integrated with an adhesive into an assembly as shown in FIG. 3B.

Figure 6A:
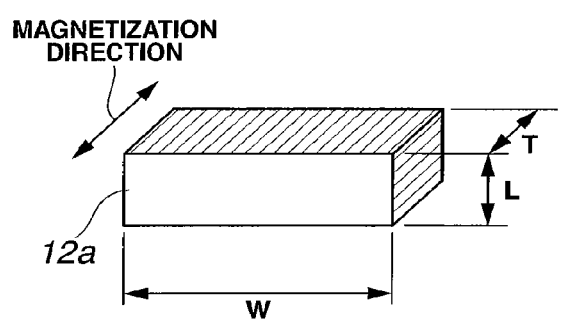
FIG. 6 illustrates another exemplary permanent magnet segment for use in the IPM motor according to the invention, FIG. 6A being a perspective view of a magnet piece which has undergone diffusion treatment with Dy or Tb from four surfaces parallel to the magnetization direction, FIG. 6B being a perspective view of an assembly of such magnet pieces.
Figure 6B:
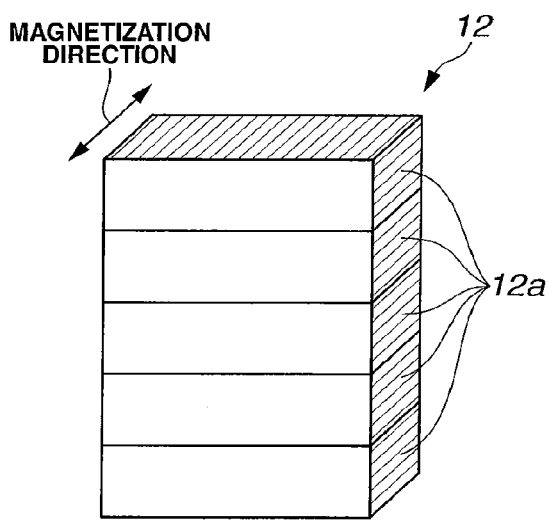

FIG. 6 illustrates another embodiment. absorption/diffusion treatment with Dy or Tb is performed from four surfaces of magnet piece 12a which extend parallel to the magnetization direction as shown in FIG. 6A (the shaded zones are surfaces from which Dy or Tb is diffused, and two non-shaded zones in X-Y plane are untreated). Five magnet pieces 12a are integrated with an adhesive into an assembly as shown in FIG. 6B (the shaded zones are surfaces from which Dy or Tb is diffused). Even in the embodiment of FIG. 3 or 6, there are available Nd magnet pieces in which the coercive force (serving as an index of demagnetization resistance) is higher near the surface of the magnet piece corresponding to the magnet outer peripheral portion than in the magnet interior. As used herein, the term "near the surface" means a subsurface region which extends about 6 mm (at most) from the surface.

Figure 4A:
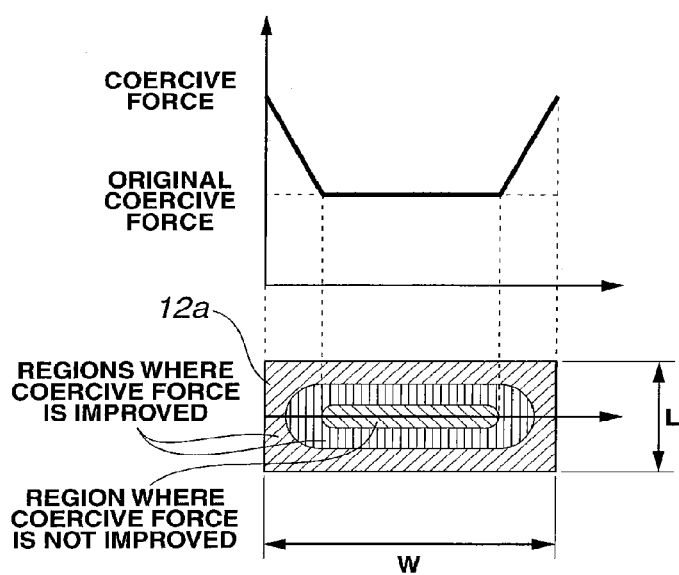
FIG. 4 illustrates the coercive force distribution in the magnet piece of FIG. 3A, FIG. 4A being in side surface, and FIG. 4B being in end surface.
Figure 4B:
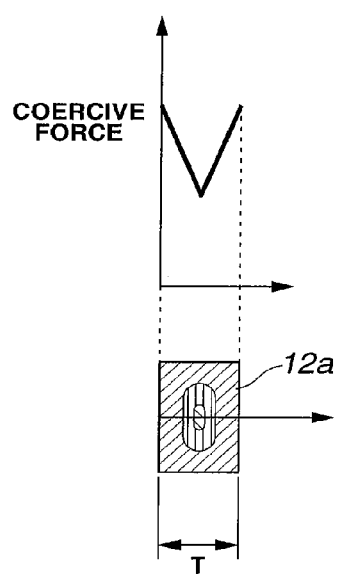

As a result of diffusion/absorption treatment with an element having an extraordinary effect of enhancing magnetocrystalline anisotropy, Dy or Tb from surfaces of a sintered Nd base magnet body, the coercive force of the sintered Nd base magnet is efficiently increased without a substantial loss of remanence. Thus the sintered magnet body has a coercive force distribution. FIG. 4 shows the coercive force distribution of a magnet piece which has undergone diffusion/absorption treatment from all surfaces thereof as shown in FIG. 3. The coercive force near the magnet surface is higher than that in the magnet interior. FIG. 7 shows the coercive force distribution of a magnet piece which has undergone diffusion/absorption treatment from four surfaces thereof parallel to the magnetization direction as shown in FIG. 6. The coercive force near the magnet surface is higher than that in the magnet interior, but the coercive forces near those surfaces perpendicular to the magnetization direction are not improved because of no diffusion/absorption from these surfaces. In the case of the IPM rotary machine, since the heat generation by eddy currents is especially high on those four surfaces (X-Z and Y-Z planes) parallel to the magnetization direction, even the coercive force distribution of FIG. 7 may improve heat resistance. Any of these embodiments is successful in increasing the coercive force near the magnet surface, providing a coercive force distribution effective for improving heat resistance against the heat generation by eddy currents.

Figure 8:
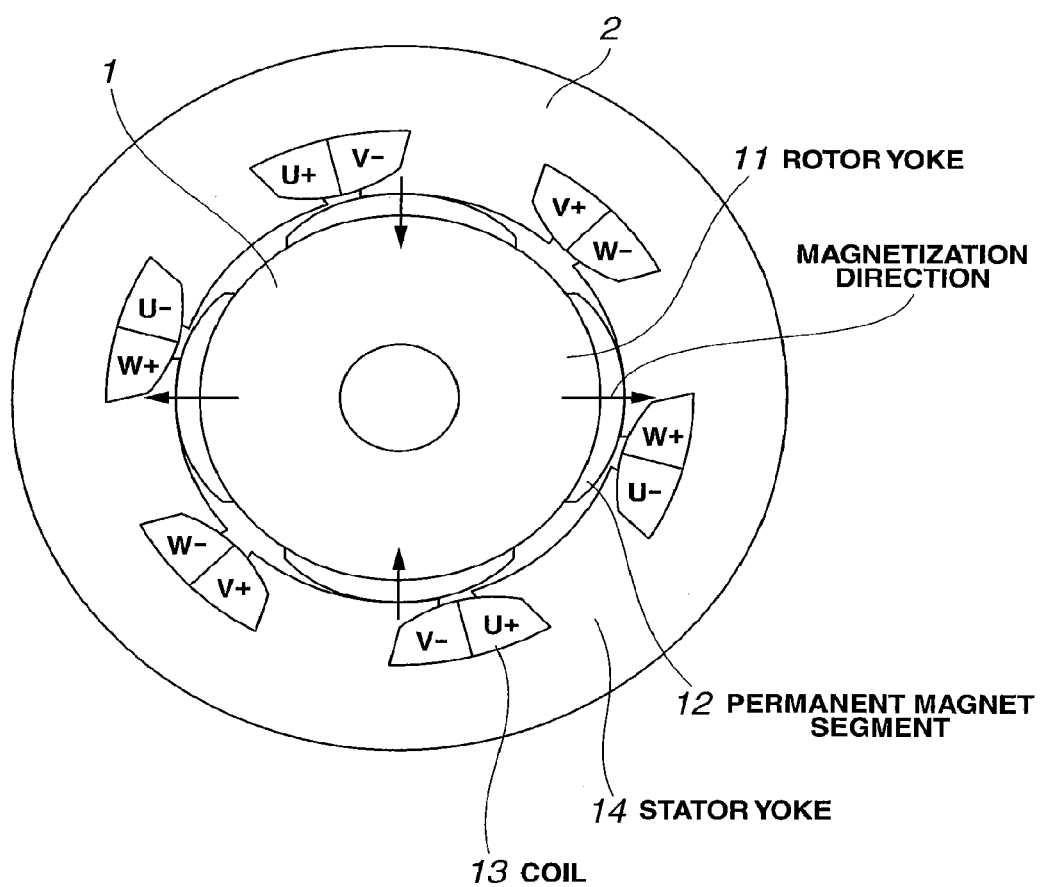
FIG. 8 is a cross-sectional view of one exemplary SPM motor of 4 poles/6 slots according to the invention.
Figure 9A:
FIGS. 9A, 9B and 9C are cross-sectional views of exemplary magnet pieces which constitute a permanent magnet assembly in the SPM motor.
Figure 9B:
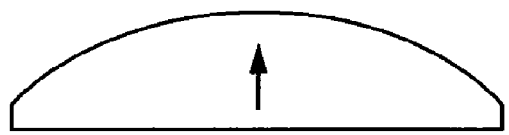
Figure 9C:
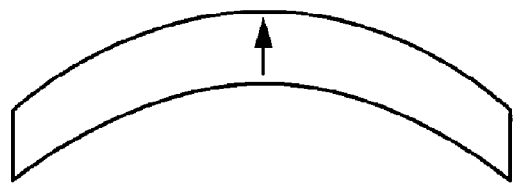

FIG. 8 illustrates an exemplary SPM rotary machine. The machine includes a rotor 1 comprising a rotor yoke 11 and a plurality of permanent magnet segments 12 attached to the surface thereof and a stator 2 having a plurality of slots, the rotor and the stator being disposed to define a gap therebetween. The stator 2 is the same as that of the IMP rotary machine. This rotary machine is utilized as AC servo motors and similar motors requiring high-precision torque control. The torque must be minimized in ripple. Accordingly, it is not preferable that the magnetic flux distribution in the gap varies with the positional relationship between the stator slot and the permanent magnet upon rotation of the rotor, to produce a cogging torque (torque with no current flow across the coils) and that torque ripples occur when electric current is flowed across the coils for driving. The torque ripples exacerbate controllability and cause noise. Used as means for reducing the cogging torque is a divided permanent magnet piece 12a of the shape that end portions are thinner than a central portion as shown in FIGS. 9C and 10A. Then the magnetic flux distribution becomes smooth at the magnet end portion which is a magnetic pole transition area having a large change of magnetic flux distribution, resulting in a reduction of cogging torque. Accordingly, a C-shaped magnet piece as shown in FIGS. 9C and 10A is often used while a D-shaped magnet piece as shown in FIG. 9B may also be used. Also acceptable from the standpoint of ease of fabrication is a rectangular magnet piece as shown in FIG. 9A.

Also in the SPM rotary machine, eddy currents flow in the permanent magnet. A divided magnet piece 12a as shown in FIG. 10A is effective for reducing eddy currents. FIG. 10B illustrates an assembly of adhesively integrated four magnet pieces 12a into which Dy or Tb has been diffused from surfaces thereof (the shaded zones are surfaces from which Dy or Tb are diffused). Even in the magnet piece 12a, eddy currents flow in a plane perpendicular to the magnetization direction. The flow of eddy currents and the temperature distribution within the magnet pieces are summarized in the schematic view of FIG. 11. As seen from FIG. 11, the density of eddy currents becomes higher at an outer peripheral portion of each magnet piece where the temperature rises. Since the magnetic field variation is greater on the stator side, the temperature distribution in the magnetization direction is higher on the stator side. The temperature distribution in the magnetization direction is greater than in the IPM motor. To suppress demagnetization due to eddy currents, the invention uses an Nd magnet piece in which the coercive force (serving as an index of demagnetization resistance) is higher near the surface of the magnet piece corresponding to the magnet outer peripheral portion and stator side than in the magnet interior.

As in the case of IPM rotary machine, diffusion/absorption treatment with an element having an effect of enhancing magnetocrystalline anisotropy, Dy or Tb from surfaces of a sintered Nd base magnet results in a magnet piece having an increased coercive force near the surface thereof without a concomitant substantial loss of remanence. Thus a rotor for SPM rotary machine having improved heat resistance is provided.

EXAMPLE

Examples are given below for illustrating some embodiments of the present invention, but the scope of the invention is not limited thereby.

Example 1

A thin plate of alloy was prepared by a so-called strip casting technique, specifically by weighing predetermined amounts of Nd, Co, Al and Fe metals having a purity of at least 99% by weight and ferroboron, high-frequency heating in an argon atmosphere for melting, and casting the alloy melt on a copper single roll in an argon atmosphere. The resulting alloy was composed of 13.5 atom % Nd, 1.0 atom % Co, 0.5 atom % Al, 5.8 atom % B, and the balance of Fe and is designated Alloy A. Alloy A was hydrided and then heated at 500° C. for partial dehydriding while evacuating to vacuum. By this so-called hydriding pulverization, the alloy was pulverized into a coarse powder having a size of up to 30 mesh. Another alloy was prepared by weighing predetermined amounts of Nd, Tb, Fe, Co, Al and Cu metals having a purity of at least 99% by weight and ferroboron, high-frequency heating in an argon atmosphere for melting, and casting. The resulting alloy was composed of 20 atom % Nd, 10 atom % Tb, 24 atom % Fe, 6 atom % B, 1 atom % Al, 2 atom % Cu, and the balance of Co and is designated Alloy B. Using a Brown mill in a nitrogen atmosphere, Alloy B was coarsely pulverized to a size of up to 30 mesh.

Subsequently, Alloy A powder and Alloy B powder were weighed in amounts of 90% and 10% by weight, respectively, and mixed together for 30 minutes on a V blender which had been purged with nitrogen. On a jet mill using high-pressure nitrogen gas, the mixed powder was finely pulverized to an average particle size of 4 μm. The resulting fine powder was compacted in a nitrogen atmosphere under a pressure of about 1 ton/cm$^2$ while being oriented in a magnetic field of 15 kOe. The green compact was then placed in a sintering furnace in an argon atmosphere where it was sintered at 1,060° C. for 2 hours, obtaining a permanent magnet block. Using a diamond grinding wheel, the permanent magnet block was machined on all surfaces into parallelepiped magnet pieces as shown in FIG. 3. These magnet pieces were dimensioned to L=5 mm, W=70 mm and T=20 mm (T in magnetic anisotropy direction). The machined magnet pieces were cleaned with an alkaline solution, pickled and dried. Steps of rinsing with deionized water were included before and after each cleaning step. These parallelepiped magnet pieces are designated M1.

Next, dysprosium fluoride having an average particle size of 5 μm was mixed with ethanol at a weight fraction of 50%, in which the parallelepiped magnet pieces were immersed for one minute with ultrasonic waves being applied. The magnet pieces were pulled up and immediately dried with hot air. At this point, the filling factor of dysprosium fluoride in the magnet surface-surrounding space was 45%. The magnet pieces were subjected to absorption treatment in an argon atmosphere at 900° C. for one hour, then to aging treatment at 500° C. for one hour, and quenched, obtaining magnet pieces M2.

Eighteen (18) magnet pieces M2 were arranged in the direction of L and bonded together with an acrylic adhesive to form an integral parallelepiped permanent magnet segment which had dimensions L=90 mm, W=70 mm and T=20 mm. Using a tester, the electric resistance between opposite ends of the segment was measured, confirming conduction.

Using these permanent magnet segments, a rotor (outer diameter 312 mm, length 90 mm) for a four-pole IPM rotary machine was manufactured. The rotor was incorporated in an IPM motor. Before and after the motor was operated at a load torque and a revolution two times the ratings, an induced electromotive force was determined. The results are shown in Table 1.

Comparative Example 1

A thin plate of alloy was prepared by a so-called strip casting technique, specifically by weighing predetermined amounts of Nd, Co, Al and Fe metals having a purity of at least 99% by weight and ferroboron, high-frequency heating in an argon atmosphere for melting, and casting the alloy melt on a copper single roll in an argon atmosphere. The resulting alloy was composed of 13.5 atom % Nd, 1.0 atom % Co, 0.5 atom % Al, 5.8 atom % B, and the balance of Fe and is designated Alloy A. Alloy A was hydrided and then heated at 500° C. for partial dehydriding while evacuating to vacuum. By this so-called hydriding pulverization, the alloy was pulverized into a coarse powder having a size of up to 30 mesh. Another alloy was prepared by weighing predetermined amounts of Nd, Tb, Fe, Co, Al and Cu metals having a purity of at least 99% by weight and ferroboron, high-frequency heating in an argon atmosphere for melting, and casting. The resulting alloy was composed of 20 atom % Nd, 10 atom % Tb, 24 atom % Fe, 6 atom % B, 1 atom % Al, 2 atom % Cu, and the balance of Co and is designated Alloy B. Using a Brown mill in a nitrogen atmosphere, Alloy B was coarsely pulverized to a size of up to 30 mesh.

Subsequently, Alloy A powder and Alloy B powder were weighed in amounts of 90% and 10% by weight, respectively, and mixed together for 30 minutes on a V blender which had been purged with nitrogen. On a jet mill using high-pressure nitrogen gas, the mixed powder was finely pulverized to an average particle size of 4 μm. The resulting fine powder was compacted in a nitrogen atmosphere under a pressure of about 1 ton/cm$^2$ while being oriented in a magnetic field of 15 kOe. The green compact was then placed in a sintering furnace in an argon atmosphere where it was sintered at 1,060° C. for 2 hours, obtaining a permanent magnet block. Using a diamond grinding wheel, the permanent magnet block was machined on all surfaces into parallelepiped magnet pieces as shown in FIG. 3. These magnet pieces were dimensioned to L=4.9 mm, W=70 mm and T=20 mm (T in magnetic anisotropy direction). The machined magnet pieces were cleaned with an alkaline solution, pickled and dried. Steps of rinsing with deionized water were included before and after each cleaning step. These parallelepiped magnet pieces are designated P1.

Next, dysprosium fluoride having an average particle size of 5 μm was mixed with ethanol at a weight fraction of 50%, in which the parallelepiped magnet pieces were immersed for one minute with ultrasonic waves being applied. The magnet pieces were pulled up and immediately dried with hot air. At this point, the filling factor of dysprosium fluoride in the magnet surface-surrounding space was 45%. The magnet pieces were subjected to absorption treatment in an argon atmosphere at 900° C. for one hour, then to aging treatment at 500° C. for one hour, and quenched, obtaining magnet pieces P2.

Eighteen (18) magnet pieces P2 were arranged in the direction of L while insulating resin sheets of 0.1 mm thick were interposed between the magnet pieces. The magnet pieces were bonded together with an acrylic adhesive to form an integral parallelepiped permanent magnet segment which had dimensions L=90 mm, W=70 mm and T=20 mm. Using a tester, the electric resistance between opposite ends of the segment was measured, confirming no conduction.

Using these permanent magnet segments, a rotor (outer diameter 312 mm, length 90 mm) for a four-pole IPM rotary machine was manufactured. The rotor was incorporated in an IPM motor. Before and after the motor was operated at a load torque and a revolution two times the ratings, an induced electromotive force was determined. The results are shown in Table 1.

Comparative Example 2

A thin plate of alloy was prepared by a so-called strip casting technique, specifically by weighing predetermined amounts of Nd, Co, Al and Fe metals having a purity of at least 99% by weight and ferroboron, high-frequency heating in an argon atmosphere for melting, and casting the alloy melt on a copper single roll in an argon atmosphere. The resulting alloy was composed of 13.5 atom % Nd, 1.0 atom % Co, 0.5 atom % Al, 5.8 atom % B, and the balance of Fe and is designated Alloy A. Alloy A was hydrided and then heated at 500° C. for partial dehydriding while evacuating to vacuum. By this so-called hydriding pulverization, the alloy was pulverized into a coarse powder having a size of up to 30 mesh. Another alloy was prepared by weighing predetermined amounts of Nd, Tb, Fe, Co, Al and Cu metals having a purity of at least 99% by weight and ferroboron, high-frequency heating in an argon atmosphere for melting, and casting. The resulting alloy was composed of 20 atom % Nd, 10 atom % Tb, 24 atom % Fe, 6 atom % B, 1 atom % Al, 2 atom % Cu, and the balance of Co and is designated Alloy B. Using a Brown mill in a nitrogen atmosphere, Alloy B was coarsely pulverized to a size of up to 30 mesh.

Subsequently, Alloy A powder and Alloy B powder were weighed in amounts of 90% and 10% by weight, respectively, and mixed together for 30 minutes on a V blender which had been purged with nitrogen. On a jet mill using high-pressure nitrogen gas, the mixed powder was finely pulverized to an average particle size of 4 μm. The resulting fine powder was compacted in a nitrogen atmosphere under a pressure of about 1 ton/cm$^2$ while being oriented in a magnetic field of 15 kOe. The green compact was then placed in a sintering furnace in an argon atmosphere where it was sintered at 1,060° C. for 2 hours, obtaining a permanent magnet block. Using a diamond grinding wheel, the permanent magnet block was machined on all surfaces into a parallelepiped magnet having dimensions L=90 mm, W=70 mm and T=20 mm (T in magnetic anisotropy direction). The ground magnet was cleaned with an alkaline solution, pickled and dried. Steps of rinsing with deionized water were included before and after each cleaning step. This parallelepiped magnet is designated P3.

Next, dysprosium fluoride having an average particle size of 5 μm was mixed with ethanol at a weight fraction of 50%, in which the parallelepiped magnet P3 was immersed for one minute with ultrasonic waves being applied. The magnet was pulled up and immediately dried with hot air. At this point, the filling factor of dysprosium fluoride in the magnet surface-surrounding space was 45%. The magnet was subjected to absorption treatment in an argon atmosphere at 900° C. for one hour, then to aging treatment at 500° C. for one hour, and quenched, obtaining magnet P4.

Using these magnets P4, a rotor (outer diameter 312 mm, length 90 mm) for a four-pole IPM rotary machine was manufactured. The rotor was incorporated in an IPM motor. Before and after the motor was operated at a load torque and a revolution two times the ratings, an induced electromotive force was determined. The results are shown in Table 1.

TABLE 1

|  | Example 1 | Comparative Example 1 | Comparative Example 2 |
|---|---|---|---|
| Drop of induced electromotive force before and after the test, % | 0 | 0 | 48 |
| Induced electromotive force after the test* | 100 | 95 | 52 |

*on the basis that the induced electromotive force in Example 1 is 100%

A comparison of Example 1 with Comparative Example 1 reveals that in Comparative Example 1, no demagnetization caused by heat generation by eddy currents was observed, but the induced electromotive force was reduced because the net magnet volume was reduced by the presence of insulating layers. A comparison of Example 1 with Comparative Example 2 reveals that in Comparative Example 2 wherein the magnet was not divided, electric conduction throughout the magnet was ensured, but eddy currents flow throughout the magnet, and thus demagnetization occurred in the region where coercive force was not improved. Example 1 is superior to either of Comparative Examples 1 and 2.

Japanese Patent Application No. 2009-229623 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. In connection with a permanent magnet rotary machine comprising a rotor comprising a rotor core and a plurality of permanent magnet segments embedded in the rotor core and a stator having a plurality of coils, the rotor and the stator being disposed to define a gap therebetween, or a permanent magnet rotary machine comprising a rotor comprising a rotor core and a plurality of permanent magnet segments mounted on the surface of the rotor core and a stator having a plurality of coils, the rotor and the stator being disposed to define a gap therebetween, the rotor wherein each of said permanent magnet segments is an assembly of two or more divided permanent magnet pieces, each of the divided permanent magnet pieces has a coercive force at a surface and an interior, the coercive force near the surface of the magnet piece is higher than that in the interior of the magnet piece, and the assembly allows for electrical conduction between the magnet pieces in the absence of an insulating layer capable of complete electrical insulation between the magnet pieces.

2. In connection with a permanent magnet rotary machine comprising a rotor comprising a rotor core and a plurality of permanent magnet segments embedded in the rotor core and a stator having a plurality of coils, the rotor and the stator being disposed to define a gap therebetween, or a permanent magnet rotary machine comprising a rotor comprising a rotor core and a plurality of permanent magnet segments mounted on the surface of the rotor core and a stator having a plurality of coils, the rotor and the stator being disposed to define a gap therebetween, the rotor wherein each of said permanent magnet segments is an assembly of two or more divided permanent magnet pieces, each of the divided permanent magnet pieces has heat resistance at a surface and an interior, the heat resistance near the surface of the magnet piece is higher than that in the interior of the magnet piece, and the assembly allows for electrical conduction between the magnet pieces in the absence of an insulating layer capable of complete electrical insulation between the magnet pieces.

3. The rotor of claim 1 wherein the magnet pieces are of a sintered Nd base rare earth magnet.

4. The rotor of claim 3 wherein each piece of sintered Nd base rare earth magnet has a coercive force profile from the surface toward the interior, which is created by letting Dy or Tb diffuse from the surface toward the interior of the magnet piece.

5. The rotor of claim 3 wherein each piece of sintered Nd base rare earth magnet has a coercive force profile from the surface toward the interior, which is created by letting Dy or Tb diffuse from the surface toward the interior of the magnet piece mainly via grain boundaries.

6. The rotor of claim 4 wherein the step of letting Dy or Tb diffuse from the surface toward the interior of the sintered Nd base rare earth magnet piece includes applying a Dy or Tb oxide powder, a Dy or Tb fluoride powder or a Dy or Tb-containing alloy powder to surfaces of the magnet piece, then holding the magnet piece at a high temperature sufficient to diffuse Dy or Tb.

7. The rotor of claim 1 wherein each of said permanent magnet segments is constructed by assembling divided permanent magnet pieces into an assembly without insulating treatment.

8. The rotor of claim 7 wherein the magnet pieces have a surface roughness Ry in the range of 50S to 0.8S.

* * * * *